3,002,994
PURIFICATION OF SALTS OF DIALKYL ESTERS OF SULFOSUCCINIC ACID
Emil F. Williams, Old Greenwich, and Norman T. Woodberry, Stamford, Conn., assignors to American Cyanamid Company, New York, N.Y., a corporation of Maine
No Drawing. Filed Sept. 2, 1958, Ser. No. 758,601
4 Claims. (Cl. 260—481)

The present invention is directed to the purification of salts of dialkyl esters of sulfosuccinic acid, and more particularly to the purification of such salts in which each alkyl group contains from 1 to 12 carbon atoms. The products of this invention may be employed where a high degree of purity on the final product is essential, as for example, in certain pharmaceutical applications.

The preparation of the salts contemplated for purification in accordance with the present invention involves the use of well-known and long-established manufacturing techniques, and thus a detailed description of such processes will be omitted here. In general, however, two moles of a suitable aliphatic alcohol are esterified with one mole of maleic anhydride to form the bis-ester. This esterification is preferably carried out with a 5 to 10% excess of alcohol over the theoretical amount necessary to produce the bis-esters, and in the presence of a small amount of an esterification catalyst, as for example, paratoluene sulfonic acid. In general, typical preparation procedures are described and may be found in U.S. Patent No. 2,028,091.

The bis esters thus formed are preferably concentrated and to some extent purified by vacuum distillation at a pressure of about 0.5 to 1 mm. of mercury, and are then sulfonated by refluxing with an alkali metal, ammonium, or ethanolamine bisulfite in an aqueous alcohol medium. This yields a technical grade of product which ordinarily has a purity of better than about 99%, but which contains small amounts of impurities as a result of the manufacturing process, such as inorganic salts, as for example, sodium sulfonate, unreacted alcohol hydrocarbons, ethers and unsulfonated esters, and sulfonated monoesters. While for many purposes, such as surfactants, a product of the purity hereinabove described is highly suited and no further purification is either necessary or desirable, there are many applications where a substantially pure product, that is, one containing inconsequential amounts of impurities of the type described hereinabove, are desirable and/or essential to a particular end use of the product.

Of particular interest in this connection are bis esters useful for pharmaceutical purposes where substantial purity is essential. A typical end use for a product of this invention is described in copending U.S. applications Serial No. 663,909, filed June 6, 1957, now Patent No. 2,871,157 and Serial No. 668,848, filed July 1, 1957, now Patent No. 2,871,158, wherein di-n-octyl sulfosuccinate salts of high purity are described as being suitable for oral administration as laxatives and fecies softeners.

In accordance with the present invention, a process is provided for purifying members selected from the group consisting of alkali metal, ammonium, and ethanolamine salts of dialkyl esters of sulfosuccinic acid, wherein the alkyl groups contain from 1 to 12 carbon atoms each, wherein said salts contain up to about 1% of impurities, which comprises dissolving such a salt in a substantially anhydrous solvent medium, which is solvent for the salts but not their hydrates and is further solvent for the impurities. After dissolution of the bis esters, sufficient water is added to the solvent-ester solution to form the hydrate of said ester, and thereafter the mixture is cooled to a temperature of between about 15° C. and about −15° C. to precipitate said ester from the solvent-water solution, after which the precipitated product is filtered and dried. During filtration the up to about 1% impurities (usually substantially less) which are soluble in the solvent are removed in the filtrate.

The alkyl esters contemplated for purification in accordance with the present process are those in which the alkyl groups contain from 1 to 12 carbon atoms, and preferably contain from 4 to 8 carbon atoms. While the process appears to function with equal effectiveness regardless of the number of carbon atoms in the alkyl groups, those products in which the alkyl groups contain between 4 and 8 carbon atoms have commercially more significance, and thus it is that the present process is directed primarily to them. In particular, the present process is directed to the production of a pharmaceutical grade of salts of di-n-octyl sulfosuccinate and salts of di-2-ethylhexyl sulfosuccinate.

In the preferred operating procedure, the alkyl esters are dried before addition to a substantially anhydrous solvent, in order that the aqueous content of the system at this critical stage in the process be known. Thus, for example, if the bis ester was not substantially dried and contained sufficient water to form the hydrate, it is evident that it would be impossible to obtain a solution thereof in a suitable solvent. It is also preferred for substantially the same reasons that the solvent itself be substantially anhydrous, and in the case of alcoholic solvents, such as methanol, ethanol, propanol, and the like, that they be characterized as absolute alcohol.

If for reasons of expediency either the dialkyl ester of the solvent contains water, it is essential that the amount of water be insufficient to form the insoluble hydrate, in order to insure satisfactory operation of the process.

The solvent may be any of the commercially available aliphatic monohydric alcohols, as for example, methanol, ethanol, propyl alcohol, butyl alcohol, amyl alcohol, and the like, or it may be substantially anhydrous or organic hydrocarbon solvents, as for example, benzene, xylene, and the like. Regardless of what the solvent may be, it should be characterized by two properties: (1) It will function as a solvent for the dialkyl ester and a major percentage of impurities contained therein, and (2) the dihydrate of the dialkyl ester must be insoluble therein.

Of the possible solvents, the absolute aliphatic monohydric alcohols, and in particular, absolute methanol and absolute ethanol, are greatly preferred, in that there is less likelihood of introducing undesirable extraneous materials in the final product when employing these. Still further, to some extent operational procedures are facilitated by employing these.

As noted hereinabove, the alkyl ester salts are placed in a suitable solvent and sufficient water is added after their dissolution to form the insoluble hydrate. Where the process is carried out using an anhydrous solvent, as for example, absolute ethanol, and a substantially dry alkyl ester, this amount should normally be sufficient to provide an excess of water, in order to insure the formation of the insoluble hydrate. It will be apparent that the amount of water added may vary from a slight excess to substantial excesses over that required to form the insoluble requisite hydrate, however, substantial excesses confer no particular benefit to the process, and at the same time increase bulk handling problems. In general, amounts of water about twice that required to form the necessary insoluble hydrate are employed. It will also be appreciated that if the solvent employed was not anhydrous, nor was the sulfosuccinate substantially dry, that only that amount of water sufficient to insure the formation of the insoluble hydrate need be added after solution of the sulfosuccinate in the solvent.

After the formation of the insoluble hydrate, the mixture is cooled to a temperature of from between 15° C. to −15° C. and preferably to a value of from between −10° and 5° C. At these temperatures, the insoluble hydrated sulfosuccinates precipitate out, although the solutions may be seeded in order to facilitate this step.

Within limits, the temperature in which crystallization and/or precipitation of the product from solution may be controlled by controlling the amount of solvent present in the system. Thus, usually precipitation from larger amounts of solvent is fostered by lower temperatures, and precipitation from smaller amounts of solvent is fostered by higher temperatures. Temperatures significantly lower than −15° C. normally result in a sluggish system, the effect of which is to retard crystallization and/or precipitation.

The concentration of the dialkyl esters of sulfosuccinic acid in solvent may be as high as 75%, and still achieve excellent purity of product. Seventy-five percent concentrations appear to be about maximum, however, in that the excess solvent is required to effectively hold out the impurities, either in solution or suspension, that the present process is designed to remove. In general, when the process is employed in systems containing low concentrations of dialkyl esters, as for example, between 20 and 60% in the solvent, the process is somewhat more effective than that at high concentrations, however, the disadvantage of handling excessive amounts of material and other commercial considerations render working at concentrations lower than 10% for the most part undesirable.

After the precipitation and/or crystallization of the hydrated alkyl esters, the precipitated product and solvent is preferably filtered and subsequently dried. Drying is preferably carried out by techniques which do not employ excessive heat, in that the function of heat appears to decompose the product, and thus adversely affect its final quality and purity. In this connection, non-freeze drying techniques, such as vacuum drying, are preferred to insure maximum quality of the product. This is true in that the hydrate is the preferred and most stable form. While drying techniques which remove the water of hydration may be employed, the resulting purified product is less stable in that it tends to absorb moisture from the atmosphere, becoming a gummy, difficultly handleable material.

In order that the present invention may be more fully understood, the following examples are given primarily by way of illustration. No details or enumerations contained therein should be construed as limitations on the present invention, except as they appear in the appended claims. All parts and percentages are by weight unless otherwise specifically designated.

*Example 1*

Fifty grams of dry di-n-butyl sodium sulfosuccinate was dissolved in 90 ml. of dry or absolute methyl alcohol. After filtration to remove extraneous solids, 8 grams of water (equivalent to a dihydrate), was added and the sample cooled to between about 0° and −5° C. Sulfonated monoester present in slight amounts is present in the first small batch of crystals and may be removed before the principal crop of crystals form. The solution was seeded and after one hour, the crop of crystals of di-n-butyl sodium sulfosuccinate was recovered by filtering. The di-n-butyl sodium sulfosuccinate, under the conditions described, crystallized as the monohydrate. Traces of sulfate present remain in the solvent upon filtration.

The method with slight modifications made necessary by the change in solubility due to change in alcohol chain length, applied equally as effectively to the di-n-amyl and di-n-hexyl compounds.

*Example 2*

A sample of 390 grams of the di-n-octyl sodium sulfosuccinate was dissolved in 800 ml. of dry methyl alcohol and filtered through a diatomaceous earth filter aid to remove extraneous solids. The filter was washed with 50 ml. of dry methanol alcohol. At least 5 moles (about 80 ml.) of water was added to the filtrate, which was allowed to stand at between about 8 and −12° C. for 1½ hours. To this was added, with stirring, 200 ml. of methyl alcohol, containing 25 ml. of water at 5° C. The mixture was centrifuged quickly in a basket centrifuge refrigerated at 10 to 15° C. The crop, after vacuum drying, was 300 to 325 grams, approximately an 80% yield.

Numerous efforts have been made heretofore to remove minor amounts of impurities of the type contemplated in this invention from dialkyl esters of sulfosuccinic acid. Such techniques as foam fractionation, Soxhlet extraction with ether and the like, have been explored, but each of these has met with only moderate success, in that they are incapable of complete removal of impurities, as for example, unsulfonated esters, alcohol, and other inorganic impurities. Further, although moderately successful, they were expensive, either through the fact that excessive lengths of time were required, thus committing personnel and equipment to the project, or that they required repeated duplication and repetition of processing with similar disadvantages.

The present process provides a simple and direct method of purification, in which conventional plant equipment can be employed, and in which the processing time may be completed in relatively short periods of time.

The quality or degree of purity of products prepared in accordance with the present invention have been and may be verified by any of a number of conventional and known techniques for determining the same. Thus, for example, it is a generally accepted principle that the purity of a surface active agent is generally questionable when its surface tension curve shows a definite minimum value. Products prepared in accordance with this invention demonstrate no marked or definite minimum value.

Thus, it has been determined in accordance with the present invention that as the impurities are removed employing the crystallization or precipitation technique described herein, that the surface tension curve of a resulting purified product shows substantially no minimum. In accordance with this invention, measurements of surface tension by the Du Nuöy ring method have been used to detect and follow the presence and removal of the impurities during the purification of the sulfosuccinate, and have been employed to verify the substantial purity of alkyl esters so purified. This has been confirmed by polarigraphic measurements.

While it may appear that small amounts of impurities of the type heretofore mentioned would not be harmful, it is emphasized that small amounts of impurities may adversely affect color, odor or physical form of a final product, and thus limit its use or preclude its use in certain specific areas. In this connection, it will be noted that sodium di-n-octyl sulfosuccinate processed in accordance with this invention is a substantially odor-free white crystalline product of pharmaceutical grade highly suited for use in oral laxative formulations. If not so purified, it would be unacceptable for such usage because of the presence of virtually unmaskable disagreeable odor.

We claim:

1. A process for purifying members selected from the group consisting of alkali metal, ammonium and ethanolamine salts of dialkyl esters of sulfosuccinic acid of a technical grade, wherein the alkyl groups contain from 1 to 12 carbon atoms, and wherein said salts contain up to about 1% of impurities resulting from their manufacturing process, which comprises dissolving such salt in a substantially anhydrous solvent which is solvent for the salt but not for its hydrate, adding sufficient water to form an insoluble hydrate of said salt and cooling said mixture to a temperature between about 15 and −15° C.

to precipitate said ester and thereafter recovering said purified ester and drying the same.

2. A process for purifying members selected from the group consisting of alkali metal, ammonium and ethanolamine salts of dialkyl esters of sulfosuccinic acid of a technical grade, wherein the alkyl group contains from 4 to 8 carbon atoms, and wherein said salts contain up to about 1% of impurities resulting from their manufacturing process and are substantially free of water, which comprises dissolving such a salt in a substantially anhydrous solvent which is solvent for the salt but not for its hydrate, thereafter adding sufficient water to form an insoluble hydrate of said salt, and cooling said mixture to a temperature of between 10° C. and −5° C. to precipitate said hydrate salt, and thereafter recovering the purified ester and drying the same.

3. A process according to claim 2 in which the substantially anhydrous solvent is absolute methanol and the salt is the sodium di-n-octyl sulfosuccinate.

4. A process according to claim 2 in which the substantially anhydrous solvent is absolute ethanol and the salt is the sodium di-n-octyl sulfosuccinate.

References Cited in the file of this patent

UNITED STATES PATENTS

| | | |
|---|---|---|
| 2,028,091 | Jaeger | Jan. 14, 1936 |
| 2,316,234 | Flett | Apr. 13, 1943 |
| 2,887,504 | Carnes et al. | May 19, 1959 |

OTHER REFERENCES

Morton: Laboratory Technique in Organic Chemistry (1938), pp. 148–51.

Weissberger: Technique of Organic Chemistry, vol. III, part I, pp. 474–479 and page 486.